United States Patent Office 3,327,358
Patented June 27, 1967

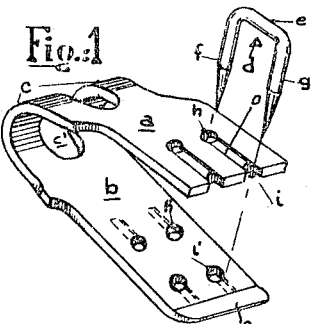
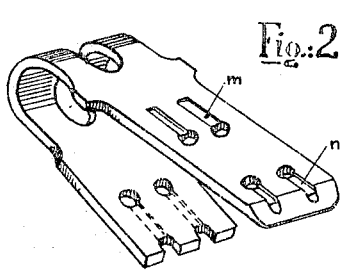
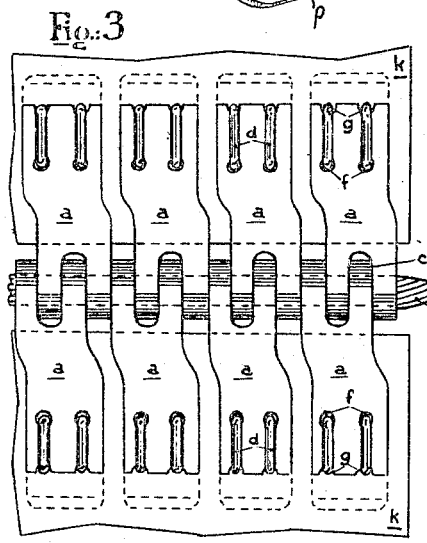
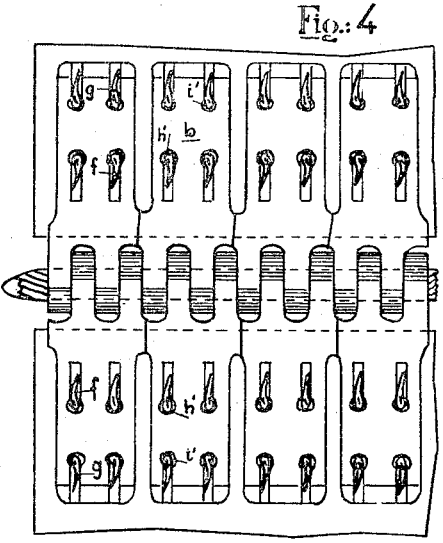
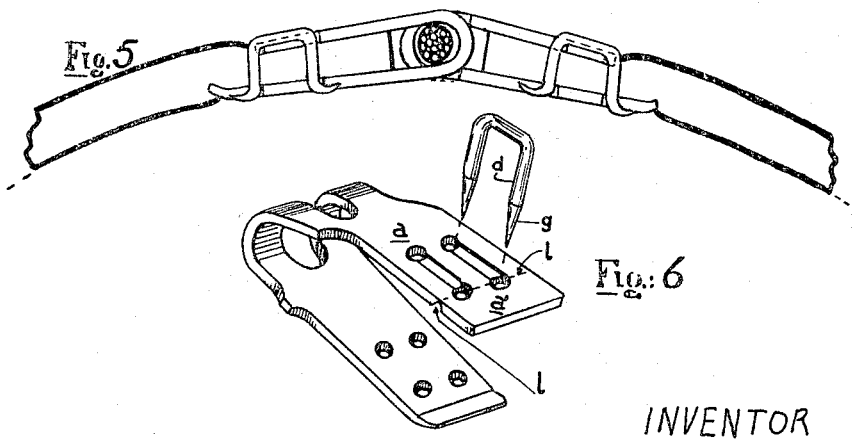

3,327,358
CLIP CONNECTION FOR BELTS
Jules Schick, Chelles, France, assignor to Goro Societe
Anonyme, Chelles, Seine-et-Marne, France
Filed Oct. 19, 1965, Ser. No. 497,640
Claims priority, application France, Dec. 11, 1964,
998,338
10 Claims. (Cl. 24—33)

This invention relates to clip connections for belts, such as drive belts or conveyor belts, and particularly to improved hinged connections of the type disclosed in my U.S. Patent No. 2,935,774.

In that earlier patent, I have shown rows of U-shaped clips mounted on the transverse terminal edges of two belt elements in such a manner that a passage is defined between the bight portion of each clip and the belt edge. The passages are aligned, and a pivot pin passes through the aligned passages so as hingedly to connect the two belt elements.

Recent improvements in materials of construction for conveyor belts have resulted in a substantial reduction of belt thickness for a given load capacity, and it has been found that the thinner belts tend to crack and break in a transverse plane which connects the end faces on the leg portions of the clips.

Stationary scrapers are commonly employed for unloading belt conveyors, and it has been found that the scraper blades tend to engage the afore-mentioned end faces of the known clips, when mounted on thin belts, and to cause failure of the clips and damage to the belt.

The primary object of the invention is the provision of a clip connection for belts which avoids premature failure of the belt and of the clips.

More specifically, the invention aims at preventing cracking and breaking of the belt near the free end face of each clip, and failure of the clips by engagement with a scraper.

I have found that the afore-described failure of conveyor belts and other belts at the free end faces of the clips is due largely to unfavorable stress distribution when the belt travels over the arcuate surface of a drive pulley or of a guide pulley, and this invention is partly based on the finding that such an unfavorable stress distribution cannot occur with a clip having two legs whose end faces are offset in the direction of belt elongation.

The invention, in one of its aspects, therefore resides in a U-shaped clip for use in a belt connection of the type described above, in which two leg portions are connected by a flexible bight portion for pivotal movement of the leg portions toward and away from each other so that the clip may be attached to a belt, one of the leg portions being longer than the other in a direction away from the bight portion.

It has also been found that the manner of fastening the clips to the belt has a substantial influence on the useful life of the belt and of the clip connection. Particularly long belt and clip life has been achieved when the longer leg portion of each clip is formed with two openings at different distances from the bight portion, and the other leg portion has an opening aligned with the opening of the longer leg portion nearer the bight portion so that one leg of a staple or similar fastening element may be passed through the aligned openings of the two leg portions and the belt element interposed therebetween, whereas the other leg of the staple extends through the farther opening in the longer leg portion and the belt only, but passes the end face of the shorter leg portion of the clip. That end face may be formed with a guide groove aligned with the farther opening of the longer leg portion for convenience in stapling the clip to the belt.

The invention also resides in a belt connection in which two rows of the afore-described clips are respectively mounted on corresponding belt elements as described hereinabove with reference to my earlier invention.

Other objects, additional features, and the concomitant advantages of this invention will be readily appreciated as the same becomes better understood by reference to the following detailed description of preferred embodiments when considered in connection with the accompanying drawing in which:

FIG. 1 shows a clip of the invention and an associated staple in a perspective view;

FIG. 2 shows the clip of FIG. 2 in a perspective view taken in a direction opposite to that of FIG. 1;

FIG. 3 is a top plan view of a belt connection of the invention;

FIG. 4 shows the belt connection of FIG. 3 in bottom plan view;

FIG. 5 is a side-elevational sectional view of the same belt connection; and

FIG. 6 illustrates a modified clip and associated staple in a view corresponding to that of FIG. 1.

Referring now to the drawing in detail, and initially to FIGS. 1 and 2, there is seen a clip which is essentially a metal strip bent into a U shape, and consists of a shorter leg portion $a$, a longer leg portion $b$, and a bight portion $c$ having an opening $c'$ therein so that the bight portion has two parts spaced in the direction of its axis of curvature and each connecting the two leg portions $a$, $b$.

Two openings $h$ through the shorter leg portion $a$ are equidistant from the bight portion $c$ and are axially spaced from each other. A corresponding pair of openings $h'$ through the longer leg portion $b$ is aligned with the openings $h$ in the direction of the pivotal movement of the leg portions $a$, $b$ when the bight portion $c$ is flexed about its axis. Two notches $i$ in the end face of the shorter leg portion $a$ remote from the bight portion $c$ are respectively aligned with another pair of opening $i'$ in the terminal part of the longer leg portion $b$, the openings $i'$ being affset from the shorter leg portion $a$ in a direction away from the bight portion $c$, as is best seen in FIGURE 5.

Two parallel grooves $o$ in the outer face of the shorter leg $a$ connect each opening $h$ with an associated notch $i$. A groove $m$ extends in the outer face of the longer leg portion $b$ from each opening $h'$ in a direction away from the corresponding opening $i'$, and a groove $n$ extends in the opposite direction in that outer face from each opening $i'$. The free end of the longer leg portion $b$ is beveled so that the terminal part $p$ of the outer face slopes toward the flat inner face of the leg portion.

The aforedescribed clip is attached to an associated belt element by means of two staples $d$ of which only one is shown in FIG. 1. The staple $d$ is made of strong wire and has two pointed, parallel legs $f$, $g$ and a transverse connecting head $e$. The spacing of the legs $f$, $g$ equals that of the paired openings $h'$, $i'$ in the longer leg portion $b$.

The manner in which several clips connect two belt ends $k$ is shown in FIGS. 3 to 5. It will be understood that the two terminal belt elements $k$ may be two ends of the same belt which is being connected into a closed loop, or the ends of two different belts. Four clips are mounted on the transverse edge portion of each belt element $k$ in such a manner that all shorter leg portions $a$ engage that major face of the associated belt element $k$ which is the outer face of the belt when the latter travels in an arcuate path, as over a pulley, in the manner indicated in FIG. 5, and all longer leg portions $b$ engage the inner belt face.

The edge portion of each belt is received between the leg portions of the several associated clips, and the bight portions $c$ of these clips are spaced from the transverse terminal edge of the belt element $k$ in the direction of belt elongation, so that each bight portion $c$ defines a transverse passage with the associated belt edge. The two parts of each bight portion c engage the opening c' of a clip on the other belt element k or an interstice between adjacent clips on that belt element so that the several passages are aligned and simultaneously receive a hinge pin or pivot pin j.

The head e of each staple d is almost completely received in an associated groove o. The leg f passes sequentially through an opening h, the thickness of the belt element k, and an opening h'. The pointed free end of the leg f is bent over so as to be received in a groove m. The leg g is guided, but not confined in a notch i of the shorter leg portion a, and passes through the thickness of the belt element k and through an opening i'. The free end of the leg g is bent so as to be received in the corresponding groove n.

The manner of assembling the belt connection shown in FIGS. 1 to 5 will be apparent to those skilled in the art. Four clips are positioned on a belt element k and are fastened by eight staples d which are driven through the belt element while the same is backed by an anvil so that the free ends of the staple legs are bent into the grooves n, m.

The modified clip illustrated in FIG. 6 differs from that shown in FIGS. 1 and 2 by an integral extension a' on the shorter leg portion a. A V-notch l which runs across the inner face of the clip separates the extension from the leg portion a proper and defines a readily frangible connection. Two openings aligned with the notch l are jointly defined by the leg portion a and the extension a' and guide insertion of the staple d in a more precise manner than the notch i described hereinabove.

When the clip shown in FIG. 6 is stapled to a belt element in a manner obvious from FIGS. 3 and 4, the impact of the staple may be sufficient to break the extension a' from the leg portion a after the extension has performed its guiding function. If the extension is not broken off during stapling, it is certain to be removed during normal service of the belt leaving a structure which is not materially different from the clip illustrated in FIGS. 1 and 2. FIGS. 3 and 4 therefore also illustrate a connection assembled from clips of the type shown in FIG. 6.

Reverting now to FIG. 5, it is seen that the free ends of the leg portions a, b are offset from each other in the direction of belt elongation. Each may therefore be driven into the belt and embedded in the belt by stapling pressure without affecting the resistance of the belt to the embedding of the free end on the other leg portion. The two leg portions may readily be made to converge in a direction away from the common bight portion as is evident from FIGS. 5. The length of the two staple legs transverse of the belt is different. The free end of the shorter leg portion is embraced by the staple and thereby held out of the path of a scraper blade which may be used for unloading the belt. The bevel p on the free end of the longer leg portion similarly prevents damage to the belt connection by the scraper.

The part of the leg portion a adjacent the notch l in the modified clip shown in FIG. 6 is embedded in the belt in a manner closely analogous to the showing of FIG. 5, and such embedding may cause the breaking-off of the extension a'. It will be appreciated that the aforedescribed mode of operation of the clip of FIGS. 1 to 5 is therefore equally applicable to the clip illustrated in FIG. 6.

The distribution of the stresses exerted by the clips of the invention on the connected belt elements k is more favorable than that of the known clips having leg portions of equal length, and the connections are more durable, particularly with relatively thin belts.

It should be understood, of course, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What I claim is:

1. A U-shaped clip for connecting two belt ends comprising: two leg portions, and a bight portion connecting said leg portions and being flexible for pivotal movement of said leg portions towards and away from each other, one of said leg portions being longer than the other leg portion in a direction away from said bight portion, whereby a terminal part of said one leg portion projects beyond said other leg portion in said direction, said leg portions being formed with respective openings therethrough aligned transversely of said direction, and said terminal part being formed with an opening therethrough offset in said direction from said other leg portion.

2. A belt connection comprising, in combination:
    (a) two belt elements having respective opposite major faces and terminal edge portions connecting said faces;
    (b) a plurality of U-shaped clips juxtaposed on each of said belt elements;
        (1) each clip having two leg portions and a bight portion connecting said leg portions, said leg portions being respectively superimposed on said faces, and said bight portion being spaced from said edge portion in a direction away from the associated belt element to define a passage therewith, one of said leg portions being longer than the other leg portion in a direction away from said bight portion, whereby a terminal part of said one leg portion projects beyond said other leg portion in said direction, said leg portions being formed with respective openings therethrough aligned transversely of said direction, and said terminal part being formed with an opening therethrough offset in said direction from said other leg portion, the passages respectively defined by said clips and by the edge portions of said belt elements being aligned;
    (c) fastening means engaging said opening and fastening said leg portions to the associated belt elements; and
    (d) a pivot pin received in the aligned passages.

3. A connection as set forth in claim 2, wherein said fastening means include a unitary fastening member associated with each clip and having two elongated portions, one of said elongated portions passing through the aligned openings of said leg portions and the associated belt element, and the other elongated portion of the fastening member passing through the belt element and the opening of said terminal part, and being located outside said other leg portion in said direction.

4. A connection as set forth in claim 3, wherein said other leg portion is formed with a guide groove open in said direction and aligned with the opening of said terminal part, said other portion of said fastening member being received in said guide groove.

5. A connection as set forth in claim 3, wherein said fastening member is a staple having two legs respectively received in said spaced openings of said longer leg portion and having free end portions projecting from said spaced openings, and a portion connecting said legs and abuttingly engaging said other leg portion of the clip, said free end portions extending from the associated openings in substantially opposite directions transverse to the direction of alignment of the openings in said two leg portions.

6. A connection as set forth in claim 3, wherein said major faces of said belt elements are substantially parallel, and said leg portions of said clip converge in said direction to such an extent that a terminal part of at least one of said leg portions remote from said bight portion is embedded in the associated major face.

7. A connection as set forth in claim 2, wherein the longer leg portions of the clips juxtaposed on one of said belt elements are superimposed on one of the major faces of said one belt element, and the other leg portions of said clips are superimposed on the other major face of said one belt element.

8. A belt connection comprising, in combination:
(a) two belt elements having respective opposite major faces and terminal edge portions connecting said faces;
(b) a U-shaped clip on each of said belt elements,
   (1) each clip having two leg portions and a bight portion connecting said leg portions, said leg portions being respectively superimposed on said faces of the associated belt element, and said bight portion being spaced from the corresponding edge portion in a direction away from the associated belt element to define a passage therewith, one of said leg portions being longer than the other leg portion in a direction away from said bight portion, whereby a terminal part of said one leg portion projects beyond said other leg portion in said direction, said leg portions being formed with respective openings therethrough aligned transversely of said direction, and said terminal part being formed with an opening therethrough offset in said direction from said other leg portion, the passages respectively defined by said clips and by the edge portions of said belt elements being aligned,
(c) fastening means engaging said openings and fastening said leg portions to the associated belt elements; and
(d) a pivot pin received in the aligned passages.

9. A belt connection comprising, in combination:
(a) two belt elements having respective opposite major faces and terminal edge portions connecting said faces;
(b) a plurality of U-shaped clips juxtaposed on each of said belt elements,
   (1) each clip having two leg portions and a bight portion connecting said leg portions, said leg portions being respectively superimposed on said faces, and said bight portion being spaced from said edge portion in a direction away from the associated belt element to define a passage therewith,
   (2) one of said leg portions being longer than the other leg portion in a direction away from said bight portion,
   (3) the longer leg portion being formed with two openings therethrough spaced in said direction, and the other leg portion being formed with an opening therethrough aligned with the opening of the longer leg portion nearer said bight portion,
   (4) the passages respectively defined by said clips and by the edge portions of said belt elements being aligned;
(c) a pivot pin received in said aligned passages;
(d) an extension on each of said other leg portions, said extension and said other leg portion jointly defining a guide passage aligned with the opening of the longer leg portion farther from said bight portion;
(e) frangible means connecting each of said extensions to the associated other leg portion; and
(f) fastening means fastening said leg portions of each clip to the associated belt elements, said fastening means including a unitary fastening member having two elongated portions,
   (1) one of said elongated portions passing through the aligned openings of said leg portions and the associated belt element, and
   (2) the other elongated portion of the fastening member passing through said belt element and the other opening of said longer leg portion, and being received in said guide passage.

10. A U-shaped clip for connecting two belt ends comprising two leg portions and a bight portion connecting said leg portions, and being flexible for pivotal movement of said leg portions towards and away from each other, one of said leg portions being longer than the other leg portion in a direction away from said bight portion, said longer leg portion being formed with two openings therethrough spaced from each other in said direction, and said other leg portion being formed with an opening aligned with the opening of said longer leg portion nearer said bight portion, and with a guide groove open in said direction and in guiding alignment with the opening of said longer leg portion farther from said bight portion.

References Cited
UNITED STATES PATENTS

| | | | |
|---|---|---|---|
| 1,490,968 | 4/1924 | Elsner | 24—35 |
| 3,101,481 | 8/1963 | Neale | 29—243.51 |

FOREIGN PATENTS

| | | |
|---|---|---|
| 122,650 | 10/1946 | Australia. |
| 730,224 | 1/1943 | Germany. |
| 772,155 | 4/1957 | Great Britain. |

WILLIAM FELDMAN, *Primary Examiner.*

MILTON S. MEHR, *Examiner.*